United States Patent
Wilkinson, III

(10) Patent No.: US 6,729,588 B2
(45) Date of Patent: May 4, 2004

(54) PIPE SHOE AND METHOD

(76) Inventor: Joseph Wilkinson, III, Rte. 6, Box 6142, Brazoria, TX (US) 77422

( * ) Notice: Subject to any disclaimer, the term of this patent is extended or adjusted under 35 U.S.C. 154(b) by 107 days.

(21) Appl. No.: 09/990,834

(22) Filed: Nov. 16, 2001

(65) Prior Publication Data

US 2003/0094547 A1 May 22, 2003

(51) Int. Cl.⁷ .............................. F16L 3/12; F16L 3/08
(52) U.S. Cl. ........................... 248/74.1; 248/74.4
(58) Field of Search ........................... 248/74.1, 65, 67, 248/73, 74.4, 505, 60

(56) References Cited

U.S. PATENT DOCUMENTS

| | | | | | |
|---|---|---|---|---|---|
| 2,425,033 A | * | 8/1947 | Fletcher | ...................... | 248/68.1 |
| 2,550,001 A | * | 4/1951 | Button | .................... | 248/49 |
| 3,227,406 A | * | 1/1966 | Shelton et al. | .............. | 248/74.4 |
| 4,020,531 A | * | 5/1977 | Ahrens et al. | .................. | 24/284 |
| 4,783,030 A | * | 11/1988 | Buerhop | ...................... | 248/74.4 |
| 4,858,861 A | | 8/1989 | Wilkinson, III | | |
| 4,951,902 A | * | 8/1990 | Hardtke | ...................... | 248/74.1 |
| 5,215,281 A | * | 6/1993 | Sherman | ...................... | 248/74.1 |
| 5,961,248 A | * | 10/1999 | Tourtellotte | .................. | 403/400 |
| 6,234,541 B1 | * | 5/2001 | Wagner et al. | .............. | 285/197 |

\* cited by examiner

Primary Examiner—Anita King
(74) Attorney, Agent, or Firm—Loren G. Helmreich; Browning, Bushman, P.C.

(57) ABSTRACT

The pipe shoe 10 includes a generally horizontal base plate 12, 52, a left-side support plate 22, 62, a right-side support plate 24, 64, a curved lower plate 32, 72, and a curved upper plate 34, 84. An attachment mechanism for securing the lower end of the upper plate to the respective support plate includes a bolt which passes through a hole in a lower end of the upper plate and a port in the respective support plate. When the bolt is tightened, the curved upper plate is pulled toward the base plate to place the bolt in both tension and shear. Each support plate is preferably angled with respect to a plane perpendicular to a plane of the base plate and away from the centerline of the pipe.

29 Claims, 2 Drawing Sheets

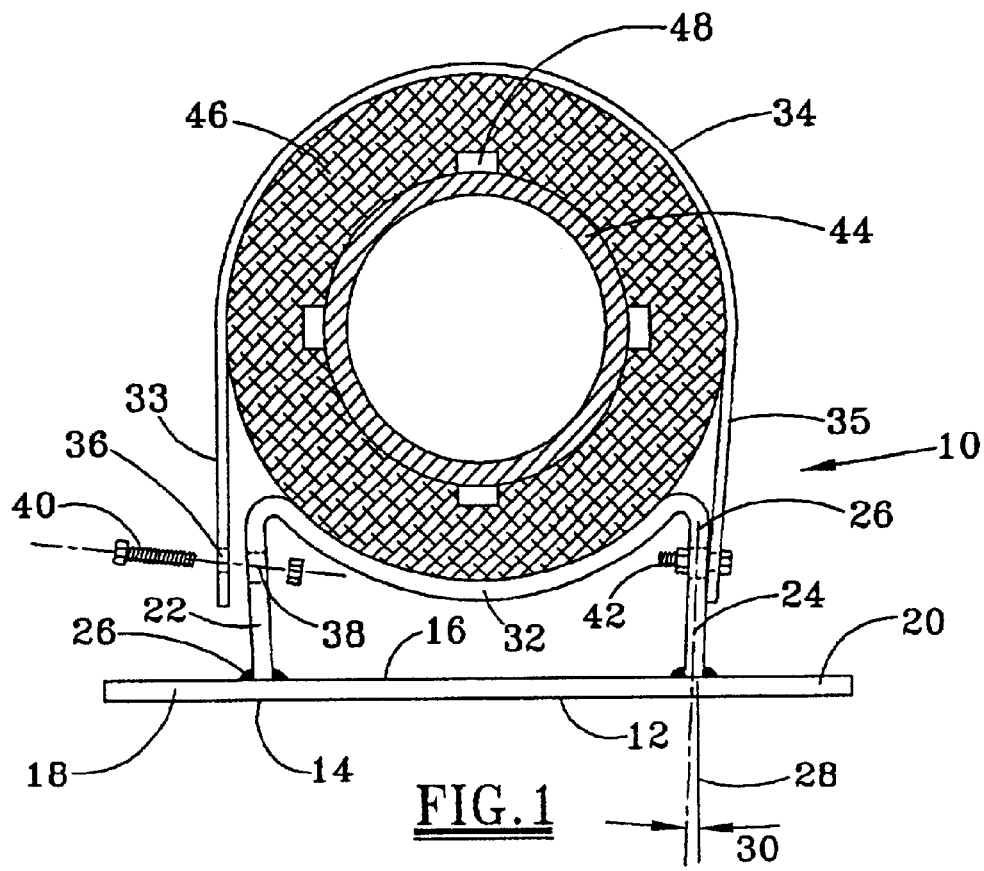
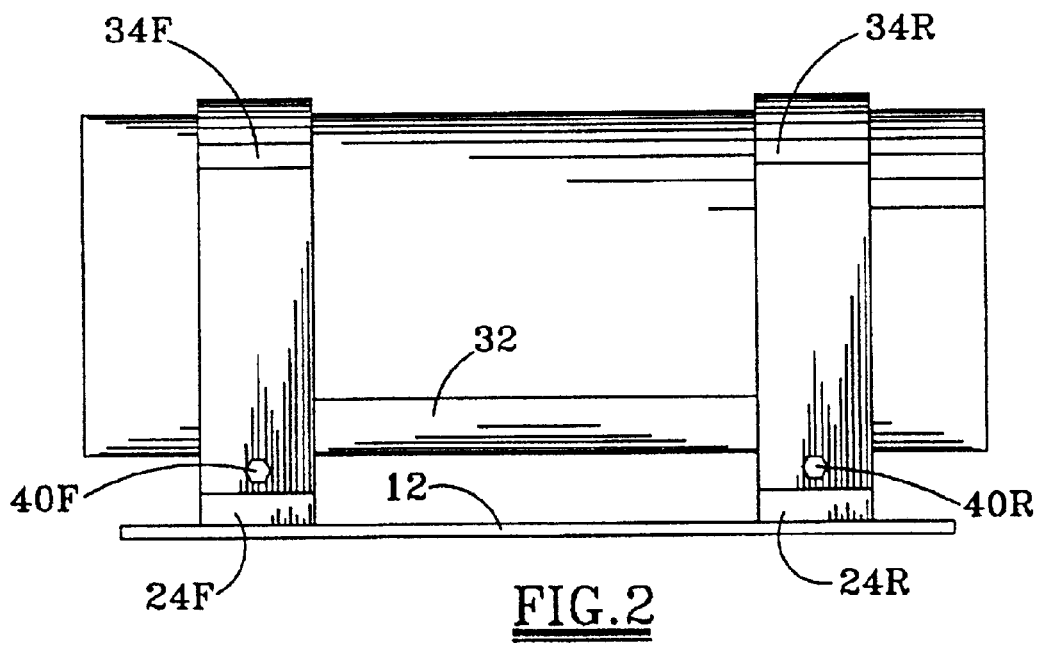

PIPE SHOE AND METHOD

FIELD OF THE INVENTION

The present invention relates to pipe shoes for supporting a pipe, conduit, or other elongate tubular member with a generally circular exterior surface. In particular, this invention relates to a clamp-type pipe shoe for supporting insulated or non-insulated pipe on a pipe rack in a commercial or industrial facility.

BACKGROUND OF THE INVENTION

Commercial and industrial facilities, such as petrochemical plants, conventionally support process piping on a series of overhead racks each having a generally horizontal top surface. A series of generally parallel pipes are typically supported at regular intervals, e.g., 6 to 12 inches, on the pipe racks, and carry gas or liquid throughout the facility. The process piping typically is supported on pipe shoes, which in turn are supported on the pipe rack at, e.g., 20 to 30 foot intervals.

Since the process piping is supported above the pipe rack, the piping may be initially installed on the pipe shoes, and the pipe thereafter wrapped or covered with insulation to retain heat within the fluid passing through the process piping, or to minimize the likelihood that liquids in the process piping will freeze during cold weather. Pipe shoes support both the pipe and the insulation above the pipe rack, and a single petrochemical facility may utilize 100,000 pipe shoes or more to support its process piping on the pipe racks.

Pipe shoes commonly include a base and a pair of axially spaced clamps for interconnecting a generally lower semicircular clamp fixed to the base to a generally upper semicircular clamp, so that the connected clamps support the piping. The base may slide along the planar upper surface of the pipe rack as the process pipe expands or contracts in length. The generally lower clamp half is welded to the base, so that the weight of the pipe is supported on the generally lower clamp half. Ears project radially outward from both the lower and upper clamp halves, and a pair of conventional bolts interconnect the mating radially-opposing ears to secure the piping to the pipe shoe.

In spite of its widespread use, the above pipe shoe has significant disadvantages, particularly when used for supporting an insulated pipe. Conventional pipe insulation typically is manufactured in axially split halves sized for a particular diameter pipe. Two insulation halves are positioned about a pipe then taped or otherwise secured thereto to form an insulated sleeve of the desired thickness. Since the process pipe is supported by the pipe shoes along the rack, the insulation installer can quickly and reliably install the split insulation along the length of a given pipe between the pipe shoes. Since the radially-opposing ears project an inch or more outward from the pipe, and since the vertical bolts which interconnect these ears are spaced outward of the pipe, the pipe shoes present problems to the insulation installer. The installer typically cuts out a portion of the insulation where the clamp ears and bolts will be located, and "puties over" the cutout holes with a caulking material to reduce heat loss from the pipe. Apart from the increased insulation cost, this process does not adequately protect the pipe as well as the insulation. Since the projecting ears in the clamp halves act as a heat sink, they draw valuable heat from the process pipe and release the heat to the atmosphere. The caulking typically tends to deteriorate, and in time cracks and breaks away from the projecting ears, thereby leading to deterioration of the insulation.

A pipe shoe which overcame many of the problems of the prior art is the Interlock™ pipe shoe, as disclosed in U.S. Pat. No. 4,858,861. More particularly, this pipe shoe reduce the time required for the insulation installer to cover the pipe. Also, the pipe shoe reduced corrosion by providing a gap between the pipe shoe and the lowest point of the pipe, thereby minimizing corrosion of both the pipe and the pipe shoe due to condensation from the outer surface of the pipe. Also, the pipe shoe facilitates the insulation of electrical heating lines or steam trace lines along an insulated pipe.

Some pipe shoes have provided a clamp exterior rather than interior to the pipe insulation. With these pipe shoes, it is difficult for the installer to place the desired and uniform radially inward clamping force on the insulation from the pipe shoe. If the pipe shoe clamping bolts are over-tightened, the insulation and/or the pipe may be damaged, e.g., when using fiberglass or plastic pipe. If the clamp shoe bolts are under-tightened, the pipe is allowed to undesirably slide within the pipe shoe during thermal expansion and contraction of the pipe. Moreover, the radially projecting clamp ears may interfere with other pipe shoes, and significantly limit the area in which the installer may safely operate.

The disadvantages of the prior art are overcome by the present invention, and an improved pipe shoe and a method of installing a pipe shoe between a pipe and a pipe rack are hereinafter disclosed.

SUMMARY OF THE INVENTION

The pipe shoe according to a preferred embodiment the present invention supports a pipe or other elongate member from a pipe rack or other structural support. The pipe shoe includes a generally horizontal base plate, and a left-side support plate and a right-side support plate each fixed to and extending generally upward from the base plate, with each support plate including a respective left-side and right-side support plate port. A curved lower plate is fixed to and supported on the left-side support plate and the right-side support plate, and is configured for supporting the elongate member. After the pipe is positioned on the curved lower plate, a curved upper plate is positioned over the pipe, with a left-side upper plate hole and right-side upper plate hole at the lower ends thereof. Due to an enlargement in one or more of the holes, a bolt is passed through the upper plate hole and the respective left-side or right-side support plate hole for receiving a bolt. When the bolts are subsequently tightened, the curved upper plate is effectively pulled downwards onto the lower curved plate, thereby providing a desired radially inward clamping force which is uniformly distributed about the circumference of the pipe. Due to an inclination between the lower ends of the curved upper plate and the support plates, the tightened bolts are placed in both tension and shear.

It is an object of the present invention to provide a pipe shoe which reliably supports a pipe on a pipe rack or other structural support by applying a substantially uniform clamping force to a major circumferential portion of the pipe.

It is a related object of the present invention is to provide a pipe shoe which does not include radially outwardly extending ears to secure the pipe to the pipe shoe.

Yet another object of the invention is an improved method of supporting a pipe from a pipe rack or other structural support, wherein one or more bolts may be tightened to pull the curved upper plate toward the base plate while placing the bolts in both tension and shear.

A significant feature of the present invention is that each of right-side support plate and left-side support plate may be angled with respect to a plane perpendicular to a plane of the base plate. Each support plate is angled away from the centerline of the pipe, such that tightening the bolts pulls the lower ends of the upper plate toward the lower portion of the pipe. More particularly, each of the support plates is preferably angled at from 1° to 5° with respect to the plane perpendicular to the base plate.

Another feature of the invention is that the same type of attachment mechanism may be used for securing the right-side lower end of the upper plate to the right-side support plate, and the left-side lower end of the upper plate to the left-side support plate.

Another significant feature of the invention is that each of the support plates is positioned radially inward of the respective lower end of the upper plate, thereby reducing the costs of manufacturing the pipe shoe.

Still another significant feature of the invention is that the curved lower plate is configured for planar engagement with the pipe along a circumferential length of from 90° to 160°. Each of the curved lower plate and the curved upper plate may have an arcuate interior surface with a radius substantially conforming to an exterior surface of the pipe.

Yet another feature of the invention is that the pipe shoe may include a front left-side support plate and a front right-side support plate each secured to the base plate, the rear left-side support plate and a rear right-side support plate each affixed to the base plate, and a curved lower plate which extends axially from the front support plates to the rear support plates. A curved front upper plate is provided for engagement with the front support plates and a curved rear upper plate for engagement with a rear support plates.

An advantage of the pipe shoe according to this invention is that conventional components with well known stress and load characteristics are used to fabricate the pipe shoe.

A further advantage of the invention is that the same style pipe shoe may support insulated pipe or bare pipe.

These and further objects, features, and advantages of the present invention will become apparent from the following detailed description wherein reference is made to the figures in the accompanying drawings.

BRIEF DESCRIPTION OF THE DRAWINGS

FIG. 1 is an end view of one embodiment of a pipe shoe according to the present invention, with the pipe shoe supporting an insulated pipe.

FIG. 2 is a side view of a pipe shoe shown in FIG. 1.

DETAILED DESCRIPTION OF THE PREFERRED EMBODIMENT

Figure 3:
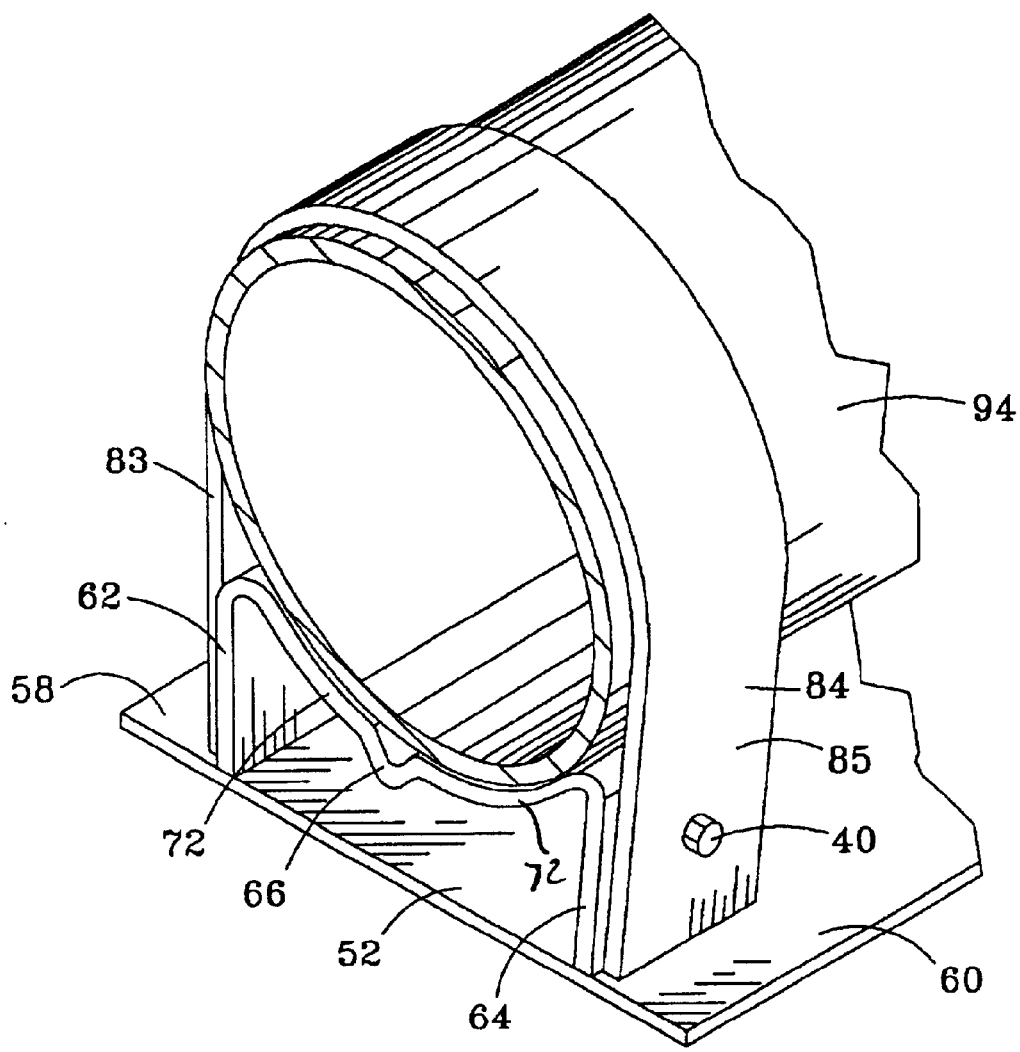
FIG. 3 is a pictorial view of a portion of an alternate embodiment of a pipe shoe according to the present invention supporting a bare pipe.

FIG. 1 depicts a pipe shoe 10 according to the present invention for supporting an insulated pipe. The pipe shoe 10 includes a generally rectangular base plate 12 which has a lower planar surface 14 for sliding engagement with a top surface of a pipe rack or other structural support, and a parallel upper planar surface 16 for supporting a left-side support plate 22 and a right-side support plate 24, e.g. by weld 27. Preferably the left-side 18 and the right-side 20 of the base plate 12 are spaced outwardly from respective support plates 22, 24, so that conventional guides (not shown) may guide the pipe shoe 12 as it moves axially with respect to the pipe rack in response to thermal expansion or contraction of the pipe. As shown in FIG. 1, the pipe shoe includes a lower curved plate 32 which is affixed to and supported on both the left-side support plate 22 and the right-side support plate 24. Preferably a unitary component including plates 22, 32 and 24 may be formed using conventional manufacturing equipment to achieve the desired shape, then the support plates welded to the base plate 12.

For reasons explained more fully below, each of the base plates 22, 24 is angled with respect to a plane perpendicular to the base plate. Plate 24 has a plate centerline 26 which is angled from a plane 28 perpendicular to the base plate 12 at an angle 30. Both the left-side support plate and the right-side support plate are preferably angled away from the centerline of the pipe, so that tightening of the bolts as described subsequently pulls the lower end of the upper plates toward the lower portion of the pipe. The angle 30 is preferably from about 1° to about 5°, more particularly from about 1° to about 2°. Each support plate 22, 24 includes a support plate port 38 which, as is disclosed subsequently, may be a hole which is slotted or otherwise oversized with respect to the bolt which passes through this port. The pipe shoe 10 also includes a curved upper plate 34 with a left-side lower end 33 and a right-side lower end 35. The lower ends 33, 35 each include a hole 36 for receiving the bolt 40, with the bolt being tightened by a conventional nut 42.

Before tightening the bolts 40, FIG. 1 illustrates that a centerline of the hole 36 is intentionally positioned above the centerline of the hole 38, so that the bolt 40, when inserted, is downwardly angled. The spacing between the lower ends 33, 35 of the upper curved plate 34 and the respective left-side support 22 and the right-side support 24 typically will not be as significant as shown in FIG. 1 before the bolt is tightened, and this spacing is somewhat exaggerated in FIG. 1 for clarity. In any event, tightening of the bolt will pull the curved upper plate 34, and more particularly the lower end 33, toward the base plate and will place the bolt 40 in both tension and shear when the bolt is tightened. The bolt 40 when tightened will thus abut the upper end of the port 38 and the lower end of the hole 36 when the bolt is placed in shear by tightening, thereby pulling the lower end 33 toward a lower portion of the pipe. Once the pipe shoe has been assembled on the pipe, each of the curved lower plate 32 and the curved upper plate 34 have an arcuate interior surface with a radius substantially conforming to an exterior surface of the pipe, and the combination of these plates effectively secures the pipe shoe to the pipe by substantially uniform clamping forces.

For the embodiment as shown in FIG. 1, the pipe shoe 10 supports a pipe 44 which includes an insulation layer 46. The insulation layer 46 may include an elongate slot or cutout 48 for receiving electric trace or steam trace lines. For the embodiment as shown in FIG. 1, the curved lower plate is configured for planar engagement with the pipe along the circumferential length of from 90° to 140°, while the curved upper plate is configured for planar engagement with the pipe along a circumferential length of approximately 180°. The term "pipe" is intended in its broadest sense to cover pipe, conduit, or other objects with a generally circular exterior surface. When the pipe includes insulation such as shown in FIG. 1, the pipe is defined as both the fluid carrying conduit and the insulation layer. Also, the terms "left-side" and "right-side" are broadly intended to refer to either side of the pipe or the pipe shoe, and the left-side support will obviously be a right-side support if looking from an axially opposing end of the pipe.

In a preferred embodiment as shown in FIGS. 1 and 2, the attachment mechanism of securing the right-side lower end of the upper plate to the right-side support plate will be structurally the same as the attachment mechanism which secures the left-side lower end of the upper plate to the left-side support plate. Alternatively and less desirably, another type of attachment member may be used for attaching one side of the lower end of the upper plate to the respective support plate. For example, a hinge mechanism may be used for pivotally securing the left-side support plate 22 to the lower end 33, and the bolt attachment mechanism discussed above may then be used for securing the right-side lower end 35 to the support plate 24. Similarly, the left-side support 22 could be provided with inverted J-shaped attachment member, so that a left-side lower end may be provided with a mating J-shaped attachment mechanism for effectively attaching the left-side of the upper plate to the left-side support.

It may be possible in some applications to position the lower ends 33, 35 radially inward of the support plates 22, 24. In a preferred embodiment as shown in FIG. 1, the support plates 22, 24 are radially inward of the respective lower ends 33, 35 in order to reduce pipe shoe manufacturing costs and prevent the lower ends of the plate 34 from having to pass through slots in the supports.

As shown in FIG. 2, the pipe shoe 10 for insulated pipe preferably includes a front left-side support plate and a front right-side support plate 24F each secured to the base plate, and a rear left-side support plate and a rear right-side support plate 24R each secured to the base plate. The curved lower plate 32 extends axially from the front support plates to the rear support plates, thereby providing a large surface area for planar engagement with the pipe. Also, FIG. 2 depicts a front upper plate 34F and a rear upper plate 34R for engagement with the front support plates and the rear support plates, with both the front and rear upper plates being tightened by a pair of front bolts 40F and a pair of rear bolts 40R.

Referring again to FIG. 1, it should be understood that at least one or both of the ports 38 in the support plates and the holes 36 in the lower end of the upper plates is elongated or enlarged so that the bolt 40 can be easily passed through the port then the hole (or the hole then the port) and thereafter tightened, thereby exerting the force on the bolt 40 as discussed above. In this application, the spacing between the hole and the port prior to assembly and the size of the holes themselves will allow for a desired shear force on the bolt 40 when the lower ends of the upper plate are brought into planar engagement with a respective support plate, such as the lower end 35 shown in FIG. 1 in planar engagement with the support plate 24. In most applications, the desired clamping force may thus be exerted upon the curved upper plate when the bolts are both in tension and in shear. In other applications, the centerline of the port 38 may not be vertically offset from the centerline of the hole 36, but the angle 30 of the support plates 22 and 24 may be increased so that, as each bolt 40 is tightened, the lower ends 33, 35 are drawn inwardly, thereby providing some clamping force to the pipe. For most applications, however, this vertical misalignment of the hole 36 and the port 38 provides a highly effective technique to clamp the upper curved plate to the lower curved plate. Moreover, by adjusting the vertical location of the hole 36 with respect to the port 38 prior to manufacture, the manufacturer can easily determine the shear pressure on the bolt 40 and thereby provide the pipe installer with a known clamping force on the pipe without requiring the use of a torque wrench.

A significant feature of the present invention is the ease of assembling the pipe shoe. The lower curved plate 32 is adapted for supporting the pipe during the assembly process and, if desired, may support a bare pipe 44 prior to raising the pipe to place the insulation layer 46 around the pipe. The curved upper plate 34 may then be positioned on the insulated pipe and the attachment mechanisms as shown in FIGS. 1 and 2 used to fix the position of the pipe with respect to the pipe shoe.

Although the base plate 12, support plates 22, 24, and curved lower plate 32 and the curved upper plate 34 as disclosed above and as shown in the figures are solid components, these components could, if desired, be segmented, i.e., they could include sizeable cutouts or cavities to reduce the weight of the pipe shoe. A significant advantage of the pipe shoe according to the present invention is that conventional ears projecting radially outward from the pipe are not required, thereby maximizing the room for the operator during installation or repair.

FIG. 3 depicts an alternate embodiment of a pipe shoe according to the present invention, with a rectilinear base plate 52 having a left-side 58 and a right-side 60. In this case, the plate 52 may support a front left-side support 62 and a front right-side support 64 similar to the previously described supports, with similar rear left-side supports and rear right-side supports (not shown) also being fixed to the base 52. In the FIG. 3 application, the pipe shoe is supporting bare or uninsulated pipe 94, and both a front curved lower plate 72 and a similar rear curved lower plate (not shown) may be provided each supporting on a respective front and rear left-side and right-side support 62, 64. The curved lower plate thus need not extend between the front and rear supports, since the bare pipe does not require a large contact area provided by the plate 32 as shown in FIG. 2 which extends between the front and rear supports. The pipe shoe as shown in FIG. 3 includes a front curved upper plate 84 including a left-side lower end 83 and a right-side lower end 85, and also a similar rear upper plate for engagement with the rear left-side and right-side support plates. The lower curved plate 72 preferably includes an axially extended v-notch 66 which may be formed by a bending operation so that condensate on the outer wall of the pipe 94 can drop into notch 66 and thereby prevent the corrosion of both the pipe and the pipe shoe. The same attachment mechanism as discussed above is preferably used to secure the front and rear curved upper plates to the respective front and rear support plates. In yet another embodiment, a smaller base plate may support a single left-side support plate and a right-side support plate, as shown in FIG. 3, so that the plate 60 has an axial length approximating the width (axial length) of both the single curved upper plate and the left-side and right-side support plates. Also, the plate 60 could support more than two axially spaced support plates, if desired.

According to the method of the invention, the base plate, the left-side support plate, the right-side support plate, the curved lower plate, and the curved upper plate may be provided as disclosed above. One side, e.g., the left side of the lower end of the upper plate may be attached to the left-side support plate by various techniques. The right-side lower end of the upper plate is secured to the right-side support plate by inserting a right-side bolt through a hole in the right-side lower end of the upper plate and through the right-side support plate port, with at least one of the hole and port being oversized to permit the bolt to pass through the hole and the vertically misaligned port. The right-side bolt may then be tightened to pull the curved upper plate toward the base plate and place the right-side bolt in both tension and shear. In practice, both bolts may be positioned and nuts 42 installed, then the bolts alternatively tightened in stages. According to a preferred embodiment, each of the lower left-side end and the lower right-side end of the upper plate is secured to the corresponding support plate with this attachment mechanism. Also, preferably both the right and left-side support plates are angled with respect to a plane perpendicular to a plane of the base plate, with each support plate being angled away from the centerline of the pipe, such that tightening the bolts pulls the lower ends of the upper plate toward a lower portion of the pipe. As shown herein, both the left-side support plate and the right-side support plate are positioned radially inward of the respective left-side lower end and right-side lower end of the upper plate when the pipe shoe is assembled. Moreover, the curved lower plate is configured for planar engagement with the pipe along a circumferential length of from approximately 90° to approximately 160°, and patentably from approximately 100° to approximately 140°.

The pipe shoe according to the present invention may be fabricated from conventional materials. The mechanical connection between the support plates and the curved lower plate conveniently is made by a welding operation. The support plates and curved lower plate could be made from a single plate by a bending operation, but the radius of the bend would likely be increased compared to the depicted embodiments by sacrificing a portion of the curved lower plate in engagement with the pipe. Fasteners other than a bolt and nut could be used for fastening the lower ends of the upper plate to the supports, although bolts provide a convenient and inexpensive attachment mechanism which, as discussed above, allows the ports and the holes to initially be misaligned when the bolt is inserted. Also, it should be understood that the terms "hole" and "port" as used herein are broadly intended to refer to an aperture in the respective support member or upper plate, and different terms are only used to extinguish between an aperture in the support plate and an aperture in the lower end of the curved upper plate.

The foregoing disclosure and description of the invention are illustrative and explanatory thereof. Various other changes in the pipe shoe and the method of using a pipe shoe may be made within the scope of the claims and without departing from the spirit of the invention.

What is claimed is:

1. A pipe shoe for supporting a pipe from a pipe rack or other structural support, the pipe shoe comprising:
   a generally horizontal base plate for sliding engagement with the pipe rack or other structural support in response to thermal expansion of the pipe;
   a left-side support plate and a right-side support plate each affixed to and extending generally upward from the base plate, the right-side support plate including a right-side support plate port spaced upward from the base plate, the right-side support plate being angled at from 1° to 5° with respect to a plane perpendicular to the base plate;
   a curved lower plate affixed to and supported on both the left-side support plate and the right-side support plate, the curved lower plate being configured for supporting the pipe;
   a curved upper plate including a left-side lower end and a right-side lower end for positioning about the pipe;
   a left-side attachment member for attaching the left-side lower end of the upper plate to the left-side support plate;
   an attachment mechanism for securing the right-side lower end of the upper plate to the right-side support plate, the attachment mechanism including a right-side bolt spaced upward from the base plate passing through a hole in the right-side lower end of the upper plate and the right-side support plate port, such that the curved upper plate is pulled toward the base plate to place the right-side bolt in tension when the right-side bolt is tightened;
   the right-side support plate being angled with respect to a plane perpendicular to a plane of the base plate; and
   the right-side support plate being angled away from the centerline of the pipe, such that tightening the right-side bolt pulls the right-side lower end of the upper plate toward a lower portion of the pipe.

2. The pipe shoe as defined in claim 1, further comprising:
   a left-side support plate port, a left-side bolt, and a left-side support plate hole in the left-side lower end of the upper plate.

3. The pipe shoe as defined in claim 2, wherein the left-side support plate is positioned radially inward of the left-side lower end of the upper plate, and the right-side support plate is positioned radially inward of the right-side lower end of the upper plate.

4. The pipe shoe as defined in claim 1, wherein the curved lower plate is configured for planar engagement with the pipe along a circumferential length from 90° to 160°.

5. The pipe shoe as defined in claim 1, wherein each of the curved lower plate and curved upper plate have an arcuate interior surface with a radius substantially conforming to an exterior surface of the pipe.

6. The pipe shoe as defined in claim 1, further comprising:
   a front left-side support plate and a front right-side support plate each secured to the base plate;
   a rear left-side support plate and a rear right-side support plate each affixed to the base plate; and
   the curved lower plate extends axially from the front support plates to the rear support plate.

7. The pipe shoe as defined in claim 6, further comprising:
   a curved front upper plate for engagement with the front support plates, and
   a curved rear upper plate for engagement with the rear support plates.

8. A pipe shoe for supporting a pipe from a pipe rack or other structural support, the pipe shoe comprising:
   a generally horizontal base plate for sliding engagement with the pipe rack or other structural support in response to thermal expansion of the pipe;
   a left-side support plate and a right-side support plate each affixed to and extending generally upward from the base plate and angled away from the centerline of the pipe with respect to a plate perpendicular to the base plate, the right-side support plate including a right-side support plate port and the left-side support plate including a left-side support plate port;
   a curved lower plate affixed to and supported on both the left-side support plate and the right-side support plate, the curved lower plate being configured for supporting the pipe;
   a curved upper plate including a left-side lower end and a right-side lower end for positioning about the pipe;
   an attachment mechanism for securing the right-side lower end of the upper plate to the right-side support plate, the attachment mechanism including a right-side bolt passing through a hole in the right-side lower end of the upper plate and the right-side support plate port, such that the curved upper plate is pulled toward the base plate to place the right-side bolt in tension when the right-side bolt is tightened;

the right-side support plate being angled at from 1° to 5° with respect to the plane perpendicular to the base plate, and the left-side support plate being angled at from 1° to 5° with respect to the plane perpendicular to the base plate.

9. The pipe shoe is defined in claim 8, wherein the left-side support plate is positioned radially inward of the left-side lower end of the upper plate, and the right-side support plate is positioned radially inward of the right-side lower end of the upper plate.

10. The pipe shoe as defined in claim 8, wherein the curved lower plate is configured for planar engagement with the pipe along a circumferential length from 90° and 160°.

11. The pipe shoe as defined in claim 8, further comprising:
   a front left-side support plate and a front right-side support plate each secured to the base plate;
   a rear left-side support plate and a rear right-side support plate each affixed to the base plate; and
   the curved lower plate extends axially from the front support plates to the rear support plate.

12. A method of supporting a pipe from a pipe rack or other structural support, the method comprising:
   providing a generally horizontal base plate for sliding engagement with the pipe rack or other structural support in response to thermal expansion of the pipe;
   affixing each of a left-side support plate and a right-side support plate to and extending generally upward from the base plate, the right-side support plate including a right-side support plate port;
   affixing a curved lower plate to and supported on both the left-side support plate and the right-side support plate, the curved lower plate being configured for supporting the pipe;
   providing a curved upper plate including a left-side lower end and a right-side lower end for positioning about the pipe;
   attaching the left-side lower end of the upper plate to the left-side support plate;
   securing the right-side lower end of the upper plate to the right-side support plate by inserting a right-side bolt through a hole in the right-side lower end of the upper plate and the right-side support plate port;
   tightening the right-side bolt to pull the curved upper plate toward the base plate and place the right-side bolt in both tension and shear;
   providing a left-side support plate port, a left-side bolt, and a left-side support plate hole in the left-side lower end of the upper plate; and
   the left-side support plate being positioned radially inward of the left-side lower end of the upper plate, and the right-side support plate being positioned radially inward of the right-side lower end of the upper plate.

13. The method as defined in claim 12, further comprising:
   angling the right-side support plate with respect to a plane perpendicular to a plane of the base plate, the right-side support plate being angled away from the centerline of the pipe, such that tightening the right-side bolt pulls the right-side lower end of the upper plate toward a lower portion of the pipe.

14. The method as defined in claim 12, wherein the curved lower plate is configured for planar engagement with the pipe along a circumferential length of from 90° to 160°.

15. A pipe shoe for supporting a pipe from a pipe rack or other structural support, the pipe shoe comprising:
   a generally horizontal base plate for sliding engagement with the pipe rack or other structural support in response to thermal expansion of the pipe;
   a left-side support plate and a right-side support plate each affixed to and extending generally upward from the base plate, the right-side support plate including a right-side support plate port;
   a curved lower plate affixed to and supported on both the left-side support plate and the right-side support plate, the curved lower plate being configured for supporting the pipe;
   a curved upper plate including a left-side lower end and a right-side lower end for positioning about the pipe;
   a left-side attachment member for attaching the left-side lower end of the upper plate to the left-side support plate;
   an attachment mechanism for securing the right-side lower end of the upper plate to the right-side support plate, the attachment mechanism including a right-side bolt passing through a hole in the right-side lower end of the upper plate and the right-side support plate port, such that the curved upper plate is pulled toward the base plate to place the right-side bolt in tension when the right-side bolt is tightened;
   a rear left-side support plate and a rear right-side support plate each affixed to the base plate; and
   the curved lower plate extends axially from the front support plates to the rear support plate.

16. The pipe shoe as defined in claim 15, wherein the right-side support plate is angled at from 1° to 5° with respect to the plane perpendicular to the base plate.

17. The pipe shoe as defined in claim 15, wherein the left-side support plate is positioned radially inward of the left-side lower end of the upper plate, and the right-side support plate is positioned radially inward of the right-side lower end of the upper plate.

18. The pipe shoe as defined in claim 15, wherein the curved lower plate is configured for planar engagement with the pipe along a circumferential length of from 90° to 160°.

19. The pipe shoe as defined in claim 15, wherein each of the curved lower plate and curved upper plate have an arcuate interior surface with a radius substantially conforming to an exterior surface of the pipe.

20. A pipe shoe for supporting a pipe from a pipe rack or other structural support, the pipe shoe comprising:
   a generally horizontal base plate for sliding engagement with the pipe rack or other structural support in response to thermal expansion of the pipe;
   a left-side support plate and a right-side support plate each affixed to and extending generally upward from the base plate and angled away from the centerline of the pipe with respect to a plant perpendicular to the base plate, the right-side support plate including a right-side support plate port and the left-side support plate including a left-side support plate port;
   a curved lower plate affixed to and supported on both the left-side support plate and the right-side support plate, the curved lower plate being configured for supporting the pipe;
   a curved upper plate including a left-side lower end and a right-side lower end for positioning about the pipe;
   an attachment mechanism for securing the right-side lower end of the upper plate to the right-side support plate, the attachment mechanism including a right-side bolt passing through a hole in the right-side lower end of the upper plate and the right-side support plate port, such that the curved upper plate is pulled toward the base plate to place the right-side bolt in tension when the right-side bolt is tightened;

a front left-side support plate and a front right-side support plate each secured to the base plate;

a rear left-side support plate and a rear right-side support plate each affixed to the base plate; and the curved lower plate extends axially from the front support plates to the rear support plate.

21. The pipe shoe as defined in claim 20, wherein the left-side support plate is positioned radially inward of the left-side lower end of the upper plate, and the right-side support plate is positioned radially inward of the right-side lower end of the upper plate.

22. The pipe shoe as defined in claim 20, wherein the curved lower plate is configured for planar engagement with the pipe along a circumferential length of from 90° to 160°.

23. A pipe shoe for supporting a pipe from a pipe rack or other structural support, the pipe shoe comprising:

a generally horizontal base plate for sliding engagement with the pipe rack or other structural support in response to expansion of the pipe;

a left-side support plate and a right-side support plate each affixed to and extending generally upward from the base plate, the right-side support plate including a right-side support plate port;

a curved lower plate affixed to and supported on both the left-side support plate and the right-side support plate, the curved lower plate being configured for supporting the pipe;

a curved upper plate including a left-side lower end and a right-side lower end for positioning about the pipe;

a left-side attachment member for attaching the left-side lower end of the upper plate to the left-side support plate;

an attachment mechanism for securing the right-side lower end of the upper plate to the right-side support plate, the attachment mechanism including a right-side bolt passing through a hole in the right-side lower end of the upper plate and the right-side support plate port, at least one of the right-side hole and the right-side port being oversized with respect to the right-side bolt to permit the right-side bolt to pass through the hole and the port, and the curved upper plate is pulled toward the base plate to place the right-side bolt in both tension and shear when the right-side bolt is tightened; and the right-side support plate being angled away from the centerline of the pipe with respect to a plane perpendicular to a plane of the base plate, such that tightening the right-side bolt pulls the right-side lower end of the upper plate toward a lower portion of the pipe.

24. The pipe shoe as defined in claim 23, further comprising:

a left-side support plate port, a left-side bolt, and a left-side support plate hole in the left-side lower end of the upper plate.

25. The pipe shoe as defined in claim 23, wherein the curved lower plate is configured for planar engagement with the pipe along a circumferential length from 90° to 160°.

26. The pipe shoe as defined in claim 23, wherein each of the lower plate and curved upper plate have an arcuate interior surface with a radius substantially conforming to an exterior surface of the pipe.

27. A method of supporting a pipe from a pipe rack or other structural support, the method comprising:

providing a generally horizontal base plate for sliding engagement with the pipe rack or other structural support in response to expansion of the pipe;

affixing each of a left-side support plate and a right-side support plate to and extending generally upward from the base plate, the right-side support plate including the right-side support plate port;

affixing a curved lower plate to and supported on both the left-side support plate and the right-side support plate, the curved lower plate being configured for supporting the pipe;

providing a curved upper plate including a left-side lower end and a right-side lower end for positioning about the pipe;

attaching the left-side lower end of the upper plate to the left-side support plate;

securing the right-side lower end of the upper plate to the right-side support plate by inserting a right-side bolt through a hole in the right-side lower end of the upper plate and the right-side support plate port, at least one of the right-side hole and the right-side port being oversized with respect to the right-side bolt; and tightening the right-side bolt to pull the curved upper plate toward the base plate and place the right-side bolt in both tension and shear.

28. The method as defined in claim 27, further comprising:

angling the right-side support plate with respect to a plane perpendicular to a plane of the base plate, the right-side support plate being angled away from the centerline of the pipe, such that tightening the right-side bolt pulls the right-side lower end of the upper plate toward a lower portion of the pipe.

29. The method as defined in claim 27, wherein the curved lower plate is configured for planar engagement with the pipe along a circumferential length from 90° to 160°.

* * * * *